(12) United States Patent
Hargis et al.

(10) Patent No.: US 7,365,923 B2
(45) Date of Patent: Apr. 29, 2008

(54) HEAT SINK TAB FOR OPTICAL SUB-ASSEMBLY

(75) Inventors: Marian C. Hargis, Rochester, MN (US); Michael Francis Hanley, Rochester, MN (US); James Robert Moon, Oronoco, MN (US)

(73) Assignee: JDS Uniphase Corporation, Milpitas, CA (US)

( * ) Notice: Subject to any disclaimer, the term of this patent is extended or adjusted under 35 U.S.C. 154(b) by 141 days.

(21) Appl. No.: 11/042,541

(22) Filed: Jan. 25, 2005

(65) Prior Publication Data

US 2005/0162761 A1    Jul. 28, 2005

Related U.S. Application Data

(60) Provisional application No. 60/539,217, filed on Jan. 26, 2004.

(51) Int. Cl.
*G02B 7/02* (2006.01)
*G02B 6/36* (2006.01)

(52) U.S. Cl. .................. 359/820; 385/92; 385/94; 257/718; 257/675

(58) Field of Classification Search ............. 359/820; 385/92
See application file for complete search history.

(56) References Cited

U.S. PATENT DOCUMENTS

| 5,280,191 | A | * | 1/1994 | Chang ................. 257/712 |
| 6,712,528 | B2 | * | 3/2004 | Galeotti et al. ........... 385/91 |
| 6,916,122 | B2 | * | 7/2005 | Branch et al. ............ 385/92 |
| 6,958,907 | B2 | * | 10/2005 | Sato et al. ............. 361/690 |
| 7,121,743 | B2 | * | 10/2006 | Mizue ................. 385/92 |
| 2003/0180012 | A1 | * | 9/2003 | Deane et al. ............ 385/92 |
| 2005/0007741 | A1 | * | 1/2005 | Ice et al. ............. 361/704 |
| 2005/0036746 | A1 | * | 2/2005 | Scheibenreif et al. ...... 385/92 |
| 2005/0158052 | A1 | * | 7/2005 | Larson ............... 398/135 |

* cited by examiner

*Primary Examiner*—Ricky Mack
*Assistant Examiner*—Jessica T Stultz
(74) *Attorney, Agent, or Firm*—Allen, Dyer, Doppelt, Milbrath & Gilchrist, P.A.

(57) ABSTRACT

The present invention relates to a heat sinking tab for dissipating heat directly from an optical sub-assembly (OSA) to a transceiver housing, within which the optical sub-assembly is located. The heat sinking tab includes a mounting plate for mounting on the rear end of a transistor outline (TO) can, and a finger for extending into contact or close proximity to the transceiver housing. The mounting plate also provides a stiffening plate for flexible conductors used to connect the OSA leads to a transceiver printed circuit board (PCB).

11 Claims, 9 Drawing Sheets

HEAT SINK TAB FOR OPTICAL SUB-ASSEMBLY

CROSS-REFERENCE TO RELATED APPLICATIONS

The present invention claims priority from U.S. patent application Ser. No. 60/539,217 filed Jan. 26, 2004, which is incorporated herein by reference.

TECHNICAL FIELD

The present invention relates to a heat sink tab for an optical sub-assembly (OSA), and in particular to a heat sink tab forming a direct thermally conductive path between the OSA and a housing.

BACKGROUND OF THE INVENTION

Conventional transceivers include a pair of OSAs, i.e. a transmitter optical sub-assembly (TOSA) (not shown) and a the receiver optical sub-assembly (ROSA) 1, illustrated in FIG. 1. The OSAs are electrically connected to a printed circuit board (PCB) 2 via metal leads 3 or by metal leads 3 and a flexible circuit (flex) cable 4. The OSAs 1 and the PCB 2 are mounted in a transceiver module housing, generally indicated at 6, which comprises a lower case 7 and an upper case 8. Heat sinking fins 9, or other suitable heat sinking elements, e.g. pins, extend from the upper case 8 for removing heat from the module housing 6.

Increasing data rates, e.g. in excess of 10 Gb, required by the latest optical transceivers, causes in an increase in power dissipation by the active components therein resulting in an increase in undesirable heat, which must be removed. Hindering the removal of the heat is the industry's desire to use low-cost packaging, such as transistor outline (TO) cans, which are constructed out of materials having poorer thermal conductivity than the more expensive ceramic packaging alternative. Moreover, an industry shift to flex cable for connecting the OSA 1 to the PCB 2 has eliminated the heat sinking provided by the transfer of heat via the leads 3 to the PCB 2.

An object of the present invention is to overcome the shortcomings of the prior art by providing a direct thermally conductive path between an OSA and the module housing without interfering with the RF performance of the OSA and without taking up much valuable space.

SUMMARY OF THE INVENTION

Accordingly, the present invention relates to an optoelectronic device comprising:

an optical sub-assembly for converting optical signals into electrical signals or electrical signals into optical signals;

a housing including a heat dissipating cover for supporting the optical sub-assembly; and a thermally conductive heat sinking tab for transferring heat from the optical sub-assembly to the heat dissipating cover.

BRIEF DESCRIPTION OF THE DRAWINGS

The invention will be described in greater detail with reference to the accompanying drawings which represent preferred embodiments thereof, wherein.

DETAILED DESCRIPTION

Figure 1:
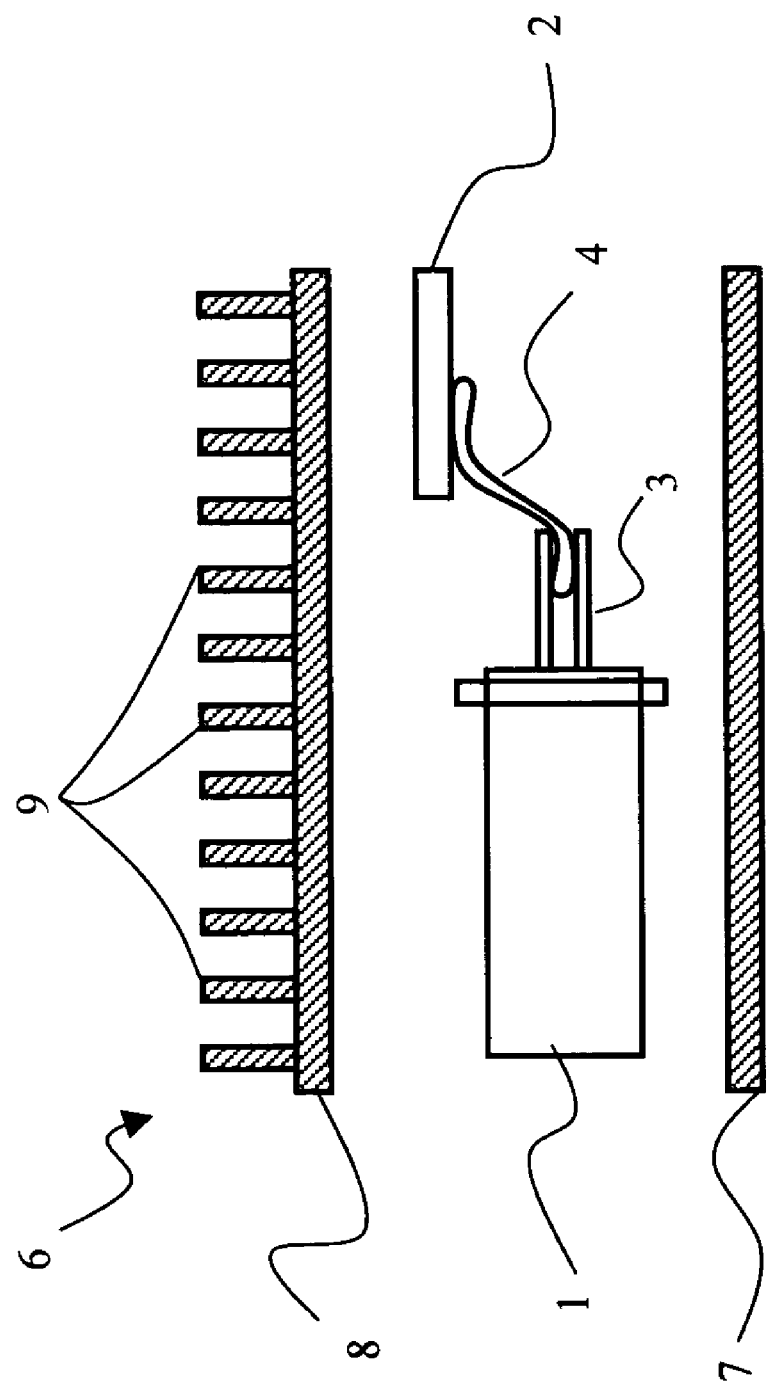
FIG. 1 is a cross-sectional view of a conventional OSA module.
Figure 2:
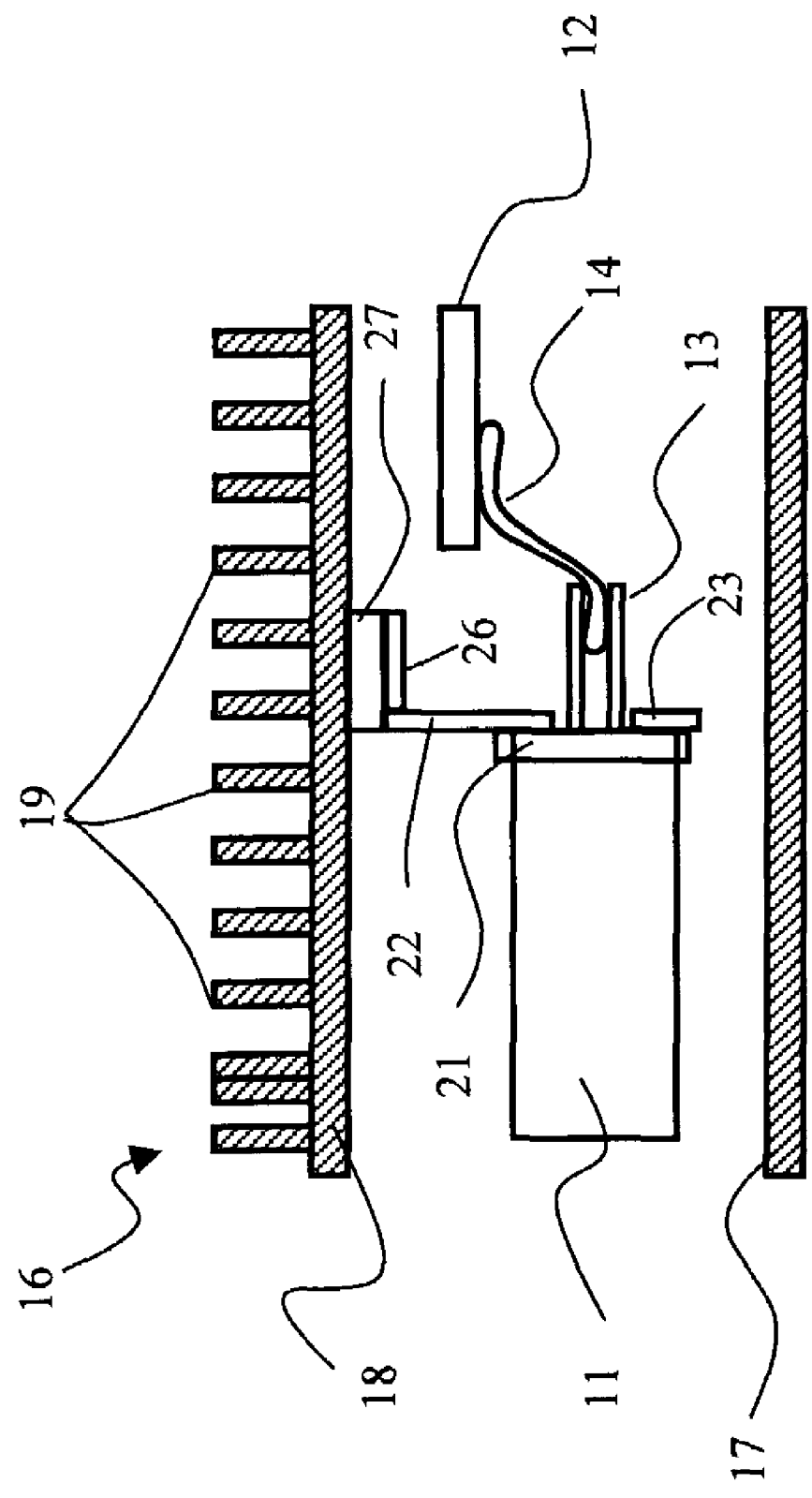
FIG. 2 is a cross-sectional view of an OSA module according to the present invention.
Figures 3, 4, 5:
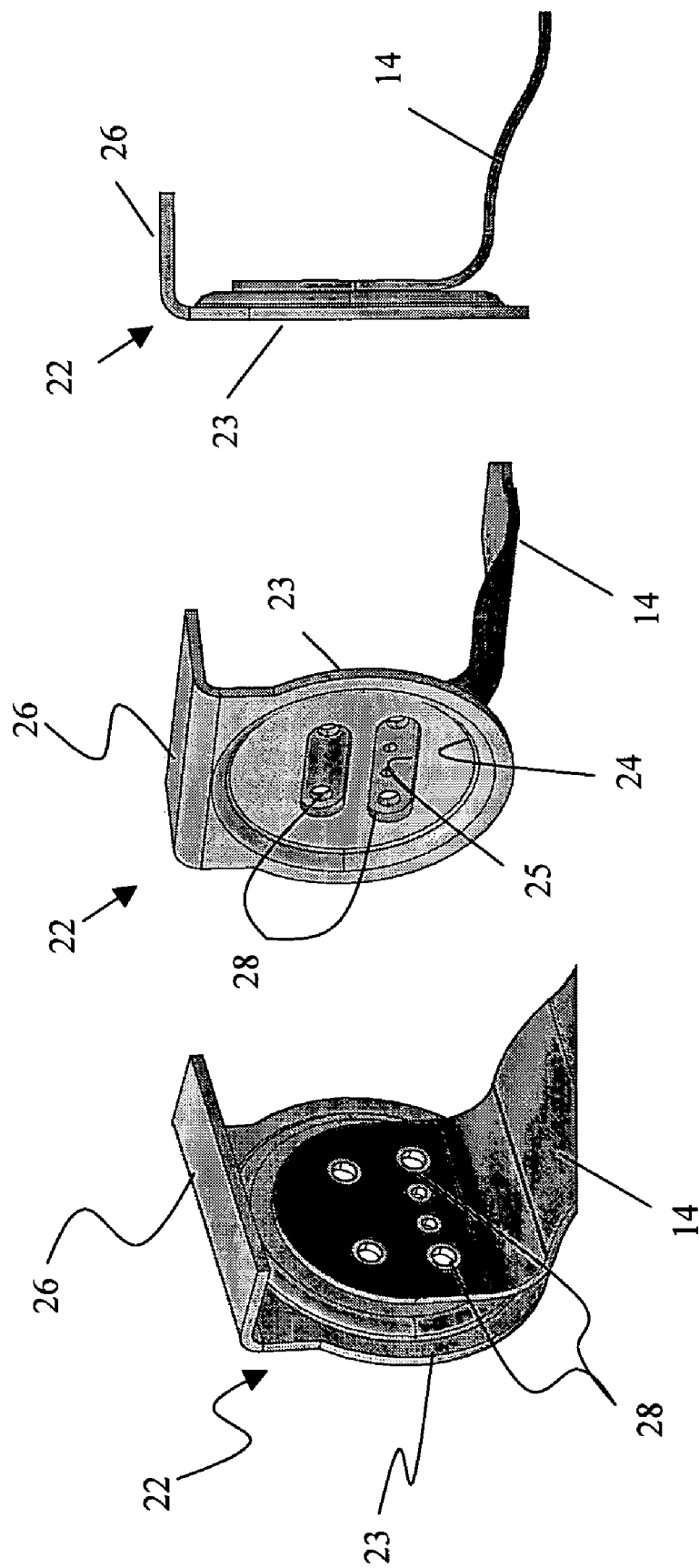
FIG. 3 is a rear isometric view of an embodiment of the heat sinking tab according to the present invention.
FIG. 4 is a front isometric view of the heat sinking tab of FIG. 3.
FIG. 5 is a side view of the heat sinking tab of FIGS. 3 and 4.
Figure 7:
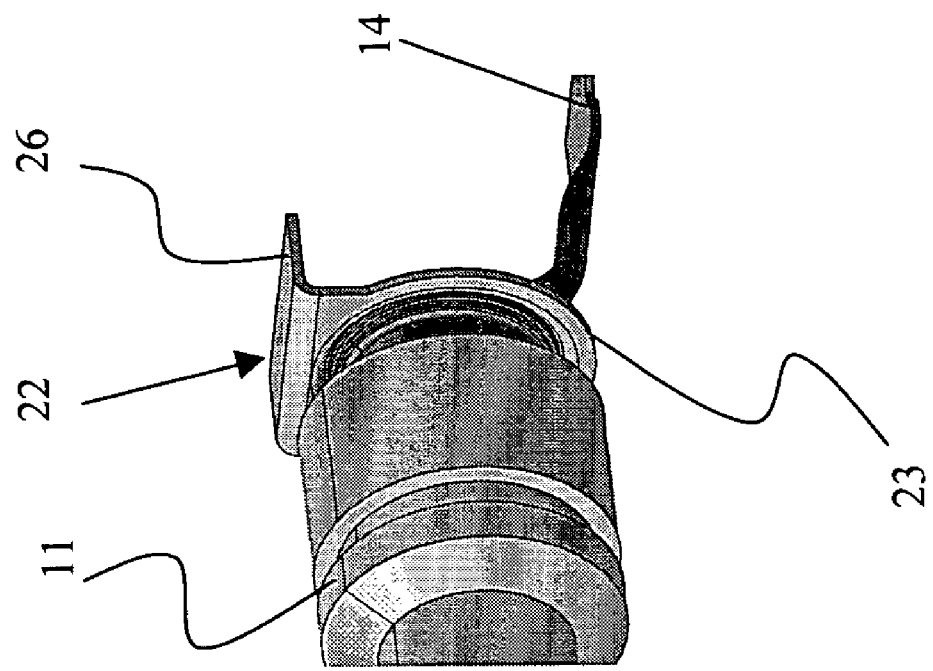
FIG. 7 is a front isometric view of the OSA of FIG. 6.
Figure 6:
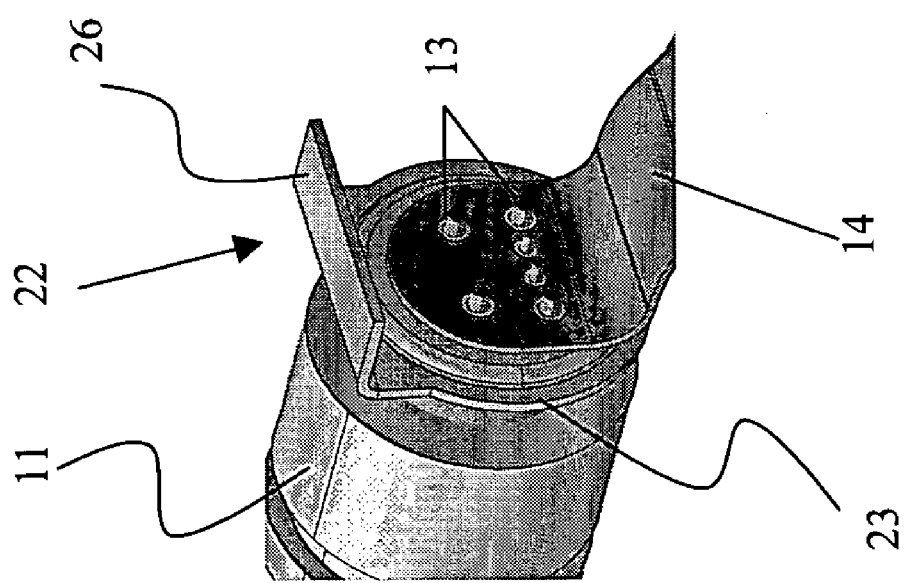
FIG. 6 is a rear isometric view of the heat sinking tab of FIGS. 3 to 5 mounted on an OSA.
Figure 9:
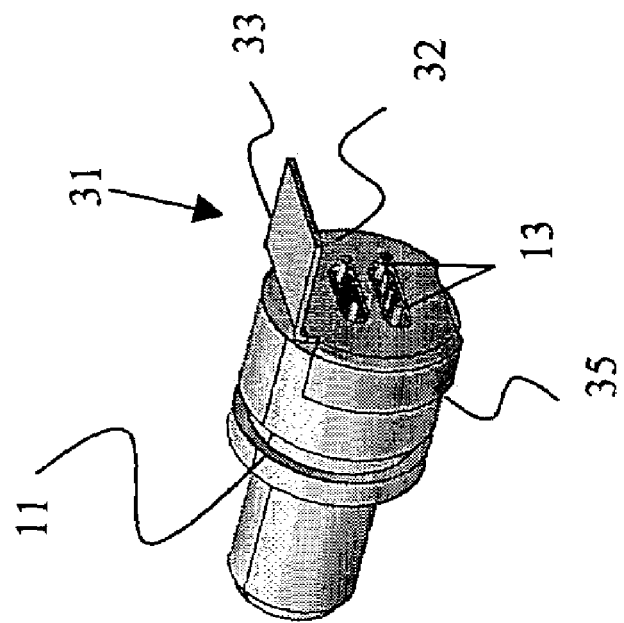
FIG. 9 is a rear isometric view of the OSA of FIG. 8.
Figure 8:
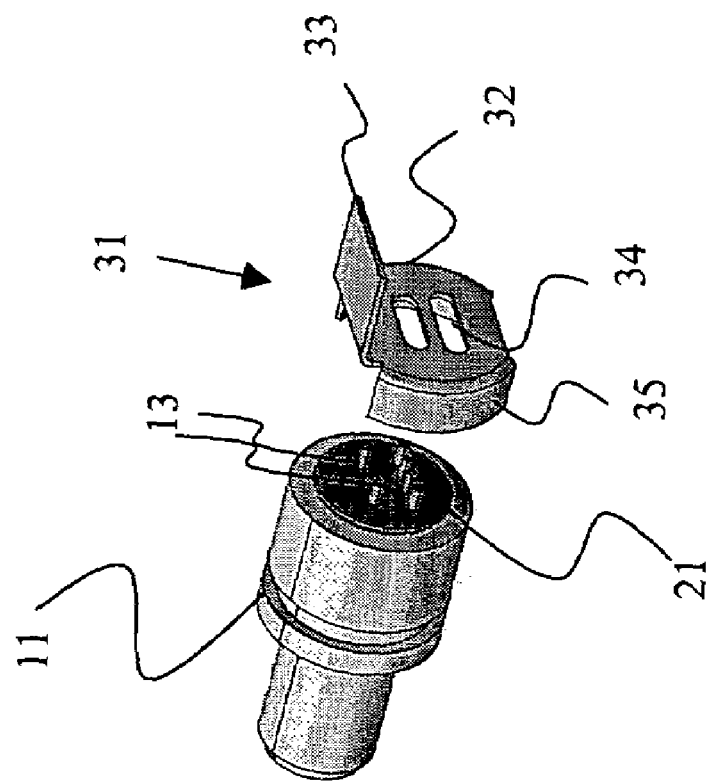
FIG. 8 is an exploded rear isometric view of an alternative embodiment of heat sinking tab according to the present invention mounted on an OSA.
Figure 11:
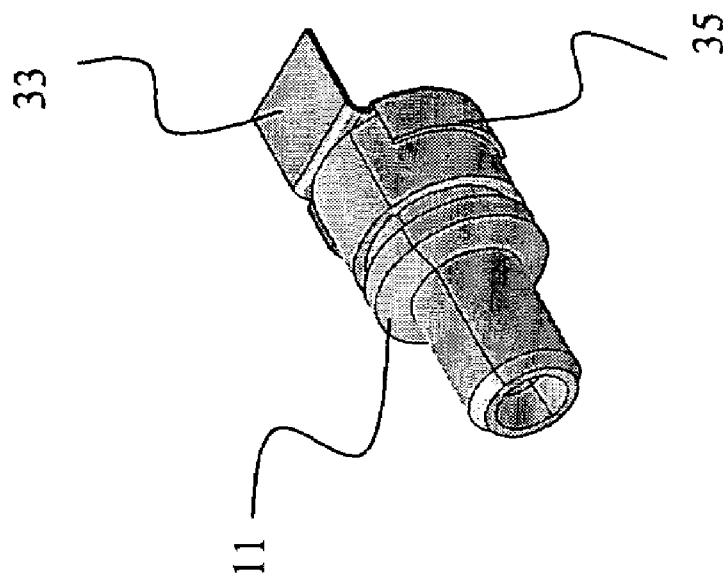
FIG. 11 is a front isometric view of the OSA of FIGS. 8 to 10.
Figure 10:
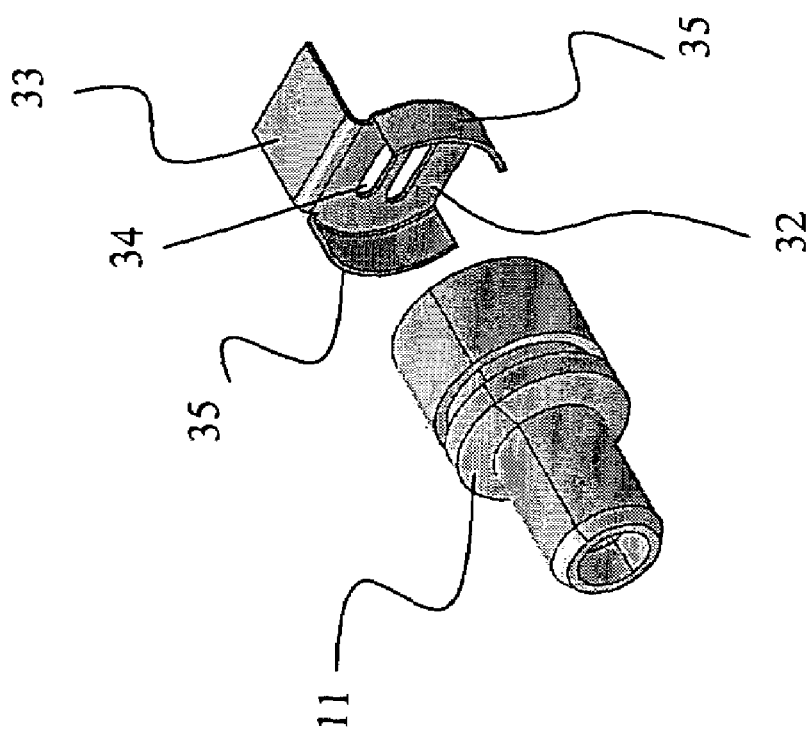
FIG. 10 is an exploded front isometric view of the OSA of FIG. 8.
Figure 12:
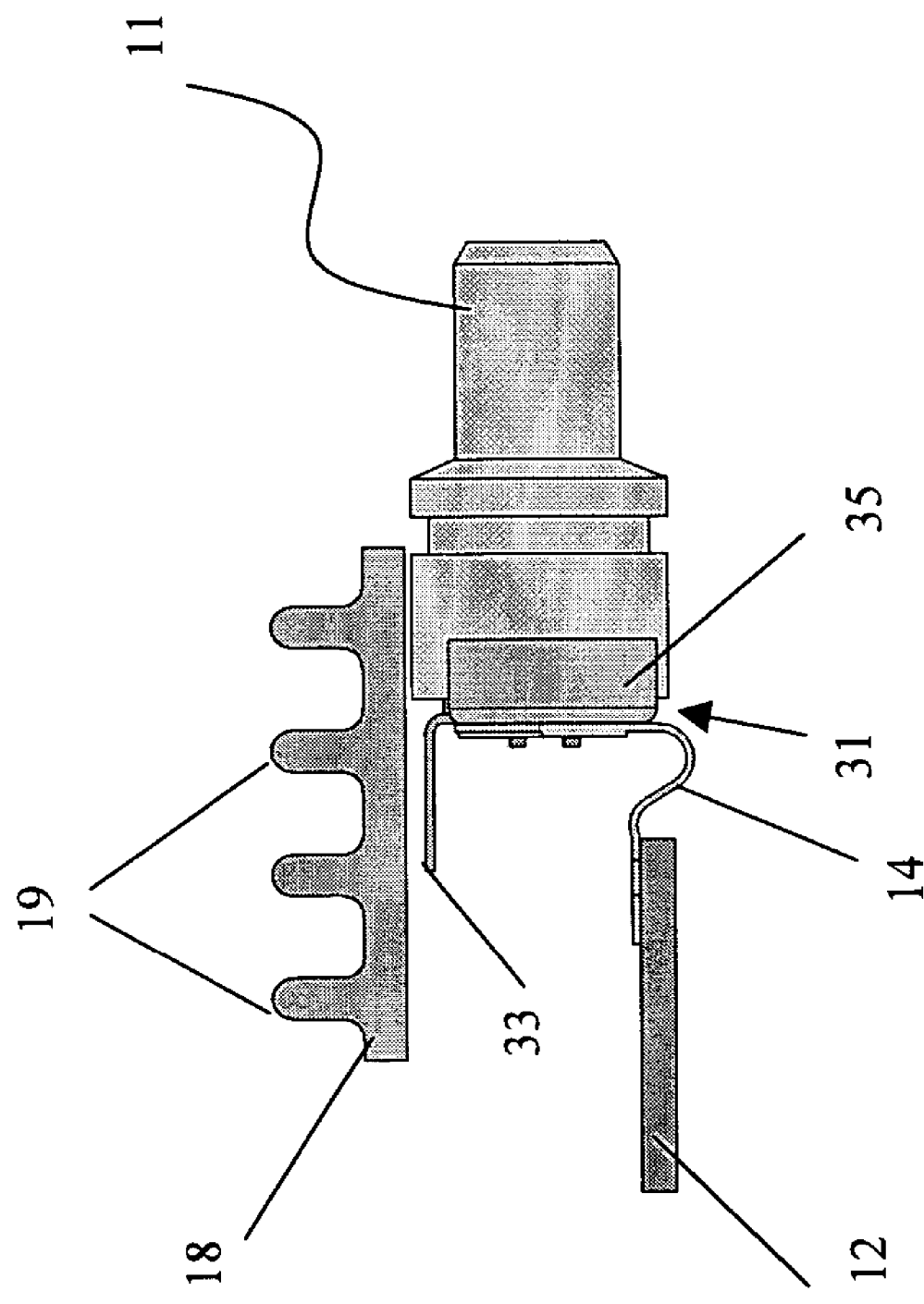
FIG. 12 is a side view of the OSA of FIGS. 8 to 11 mounted in a transceiver.

With reference to FIG. 2, a transceiver according to the present invention includes a TOSA (not shown) and a ROSA 11, which are electrically connected to PCB 12 via metal leads 13 and a flex cable 14. The TOSA and the ROSA 11 include an optical connector on the front end thereof for receiving an end of an optical fiber. A housing 16 encloses the TOSA and the ROSA 11, and includes a lower case 17 and an upper case 18. The upper case 18 includes heat sinking fins 19, although other suitable heat sinking elements are possible, for dissipating heat generated within the housing 16. Typically, an electrical connector is formed on the outer free end of the PCB 12 for electrically connecting the transceiver to a host device, although other electrical connectors, such as pins, are possible.

Each OSA includes a header 21 extending from the back end thereof, through which the leads 13 extend. A heat sinking tab 22 is mounted on the header 21 with a suitable thermal interface, e.g. solder or thermal adhesive, and extends into contact or close proximity to the upper case 18. The heat sinking tab 22 is formed out of a flexible, formable or resilient material, e.g. a thin sheet metal such as copper, which is suitably thermally conductive. The heat sinking tab 22 includes a mounting plate 23, which is stamped or coined with an annular shoulder 24 to fit over the header 21 to facilitate alignment therewith during manufacture. Slots 25 are formed in the mounting plate 23 for receiving the leads 13, which extend therethrough. The mounting plate 23 is preferably circular to match the back end of the header 21, but can be any suitable shape, including rectangular. A rectangular finger 26 extends from the mounting plate 23 into contact or close proximity with the upper case 18 for transferring heat to be dissipated by the heat sinking fins 19. A thermal pad 27 or other intermediary compliant thermal material commonly used in the industry can be placed between the upper case 18 and the finger 26 to enhance thermal contact.

Ideally the flex cable 14 is fixed to the mounting plate 23 prior to assembly with the OSA 11, whereby the mounting plate 23 provides a stiffener for an end of the flex cable 14.

Moreover, holes 28 in the flex cable 14 for receiving the leads 14 are aligned with the slots 25 in the mounting plate 23, and provide a simple self-aligning feature with the leads 14 for mounting the heat sinking tab 21 on the OSA 11.

In an alternative embodiment, illustrated in FIGS. 8 to 12, a heat sinking tab 31 includes a mounting plate 32 for mounting on the rear end of an OSA 11, a rectangular finger 33 for extending into contact with or close proximity to the upper case 18, and a pair of arcuate wings 35 forming the shape of the OSA 11, which extend perpendicularly from the mounting plate 32 parallel and in contact with the sides of the OSA 11.

Slots 34 are provided in the mounting plate 32 for receiving the leads 13, which extend therethrough into contact with the flex cable 14. With this embodiment, the wings 35 ensure that the body of the OSA 11 is aligned with the flex cable 14, so that the optical axis of the OSA 11 is aligned with the mechanical design in the housing 16, enabling control of the tolerance for the attachment of the OSA 11 to the PCB 12.

As above, the mounting plate 32 is mounted on the header 21 with a suitable thermal interface, e.g. solder or thermal adhesive, and is formed out of a flexible, formable or resilient material, e.g. a thin sheet metal such as copper, which is suitably thermally conductive. A thermal pad 27 or other intermediary compliant thermal material commonly used in the industry can be placed between the upper case 18 and the finger 33 to enhance thermal contact.

Figure 13:
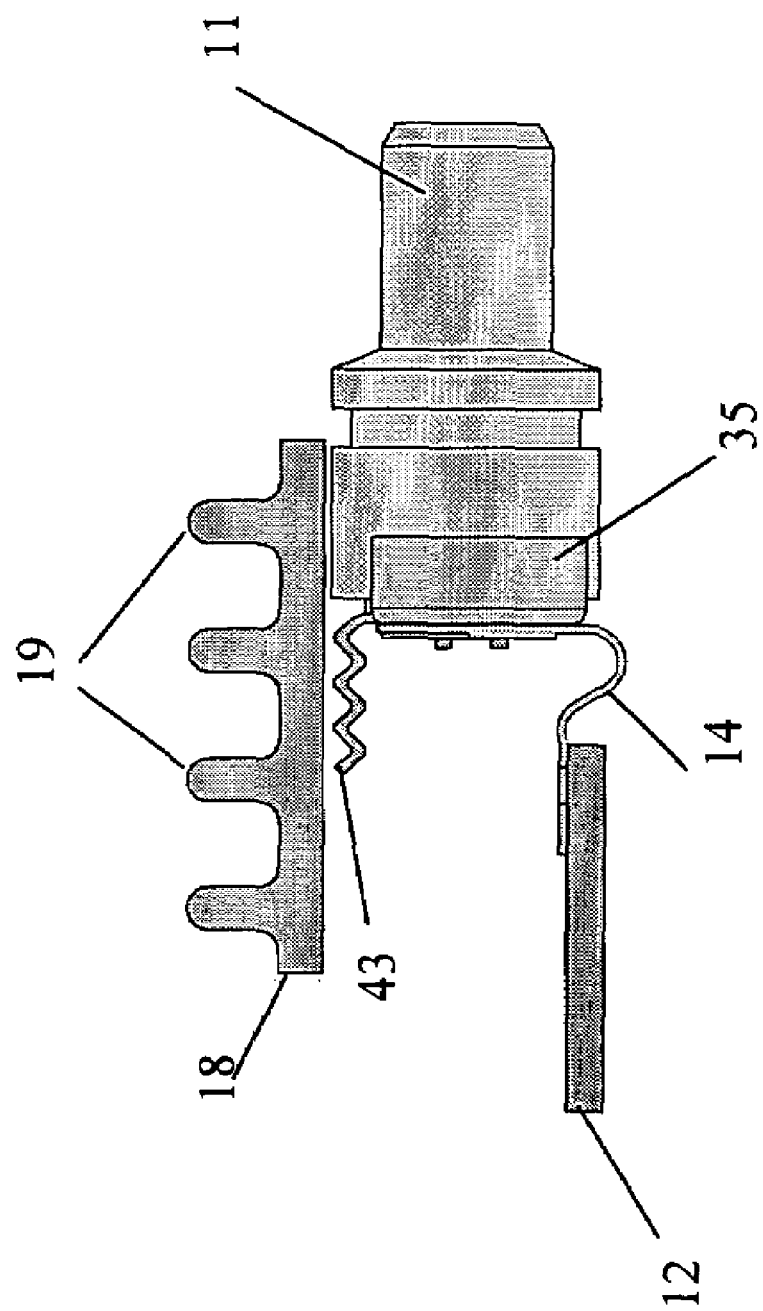
FIG. 13 is a side view of an alternative embodiment of the OSA of FIGS. 8 to 12.

With reference to FIG. 13, a corrugated rectangular finger 43 can be provided extending from the mounting plate 32. The corrugations increase the surface area of the finger 43 to increase the amount of heat transferred. If the OSA 11 were to be placed within an environment with an air flow, the corrugated finger 43 would also serve as a heat sink itself.

Figure 14:
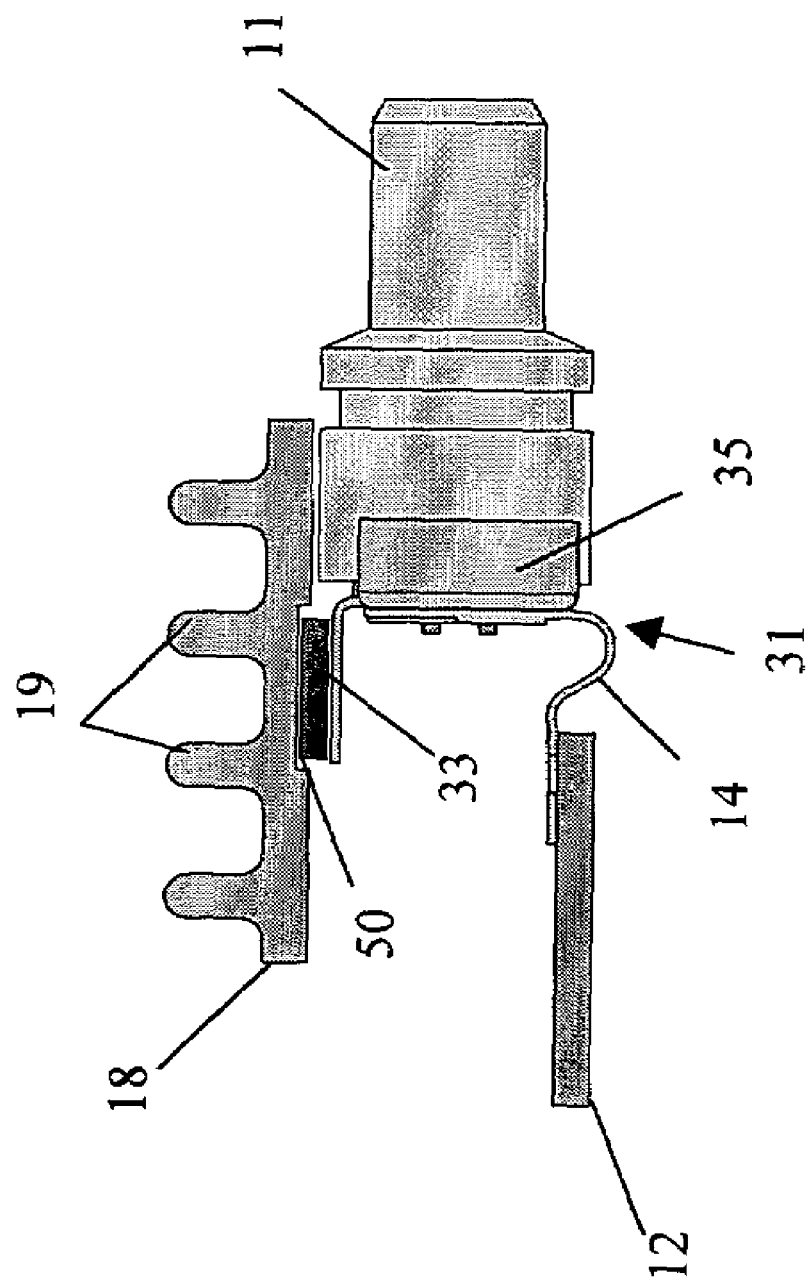
FIG. 14 is a side view of an alternative embodiment of the OSA of FIGS. 8 to 12.

FIG. 14 illustrates an embodiment of the present invention in which a thermoelectric cooler (TEC) 50 is positioned between the finger 33 and the upper case 18 to increase the amount of heat transferred therebetween. The TEC 50 device is preferably based on the Peltier effect, by which a DC current applied across two dissimilar materials causes a temperature differential. The TEC 50 enables the OSA 11 to be operated over a much larger range of temperatures, including very cold temperatures, if the typical "hot" and "cold" sides are reversed to heat the housing 16.

We claim:

1. An opto-electronic device comprising:
   an optical sub-assembly for converting optical signals into electrical signals or electrical signals into optical signals, the optical sub-assembly including a rear header forming the rear end thereof with electrical leads extending therefrom;
   a housing including a heat dissipating cover for supporting the optical sub-assembly; and
   a thermally conductive heat sinking tab for transferring heat from the optical sub-assembly to the heat dissipating cover;
   wherein the heat sinking tab includes: a mounting plate for mounting only on the rear end of the optical sub-assembly covering the rear header, with slots in the mounting plate through which the electrical leads extend, and a finger for extending into contact with or close proximity to the heat dissipating cover.

2. The device according to claim 1, wherein the mounting plate fits over the rear header of the optical sub-assembly.

3. The device according to claim 2, wherein the finger includes corrugations providing increased surface area for heat transfer.

4. The device according to claim 2, wherein the rear header is circular with the electrical leads extending therefrom; wherein the mounting plate is circular to match the header.

5. The device according to claim 1, further comprising:
   a printed circuit board mounted in the housing for controlling the optical sub-assembly; and
   a flexible electrical cable electrically connecting the leads with the printed circuit board;
   wherein an end of the flexible electrical cable is mounted on the mounting plate, whereby the mounting plate defines a stiffening plate for the flexible electrical cable.

6. The device according to claim 5, wherein the flexible electrical cable includes holes for receiving the leads; wherein the holes are aligned with the slots in the mounting plate for preventing the leads from contacting the heat sinking tab and for aligning the mounting plate with the optical sub-assembly.

7. The device according to claim 1, wherein the mounting plate includes a shoulder for aligning the heat sinking tab with the rear header.

8. The device according to claim 1, further comprising a pair of wings extending perpendicular from the mounting plate along the sides of the optical sub-assembly for aligning the heat sinking tab with the optical sub-assembly.

9. The device according to claim 8, wherein the optical sub-assembly is mounted in a transistor outline (TO) can, and wherein the wings are arcuate for abutting opposites sides of the TO can.

10. The device according to claim 1, further comprising an intermediary compliant thermal material disposed between the finger and the heat dissipating cover.

11. The device according to claim 1, further comprising a thermoelectric cooler disposed between the finger and the heat dissipating cover for increasing the amount of heat transferred therebetween.

* * * * *